United States Patent [19]

Caulfield et al.

[11] 4,042,973

[45] Aug. 16, 1977

[54] CLOSED LOOP FEEDBACK DIGITAL SYSTEM FOR EXPONENTIALLY VARYING SIGNAL FREQUENCY

[75] Inventors: Patrick J. Caulfield, Wayzata; Robert E. Diesch, Rogers; Gerald R. Strunc, Maple Grove, all of Minn.

[73] Assignee: Pako Corporation, Minneapolis, Minn.

[21] Appl. No.: 673,368

[22] Filed: Apr. 5, 1976

[51] Int. Cl.² .................. G06F 15/20; G01R 23/02; H03K 21/00
[52] U.S. Cl. .................. 235/150.3; 235/92 DM; 307/225 R; 328/38; 328/39; 324/78 D
[58] Field of Search ............... 235/150.3, 151.11, 197, 235/152, 156, 92 DM, 92 FQ, 92 T, 92 TF, 92 EV; 328/15, 38, 39, 140; 307/225 R, 233 R, 271; 324/78 D, 79 D; 331/51, 53; 321/60, 61; 318/603, 685, 696

[56] References Cited

U.S. PATENT DOCUMENTS

| 3,551,826 | 12/1970 | Sepe | 331/53 X |
| 3,657,658 | 4/1972 | Kubo | 328/38 X |
| 3,673,391 | 6/1972 | Lougheed | 235/150.3 |
| 3,832,640 | 8/1974 | Cederquist et al. | 328/38 |
| 3,835,396 | 9/1974 | Demos et al. | 328/38 X |

*Primary Examiner*—Joseph F. Ruggiero
*Attorney, Agent, or Firm*—John W. Adams

[57] ABSTRACT

An electronic closed loop feedback digital system generating a square-wave like signal the frequency of which may be selectively increased or decreased in a generally exponential manner.

3 Claims, 11 Drawing Figures

CLOSED LOOP FEEDBACK DIGITAL SYSTEM FOR EXPONENTIALLY VARYING SIGNAL FREQUENCY

There are many applications in the electronics industries for devices which can produce signals the frequencies of which vary over time according to some known relationship. Said devices are especially useful in accelerating and decelerating stepping motors to a desired velocity. The devices commonly used for such applications are analog in nature, which are complex and relatively inaccurate devices and are at variance with the increased modern use of digital control systems.

It is an object of the present invention to provide an electronic closed loop feedback digital system to generate a square wave type signal of exponentially varying frequency from a constant frequency square wave input signal.

It is a more particular object of the present invention to provide a closed loop feedback digital system including a first frequency multiplier which generates a square wave type first signal whose frequency is equal to the frequency of said input signal multiplied by a first multiplication factor, said multiplication factor determined by the state of a counter which is responsive to the cycles of said first signal.

It is another object of this invention to provide modification circuitry to generate a second signal of exponentially varying frequency from said first signal including a second frequency multiplier which generates said second signal whose frequency is equal to the frequency of said input signal multiplied by a second multiplication factor, said second multiplication factor determined by the state of a second counter which is responsive to the cycles of said first signal.

These and other objects and advantages of this invention will be apparent from the following description made in connection with the accompanying drawings wherein like reference characters refer to similar parts throughout the several views, and in which:

Figure 1:
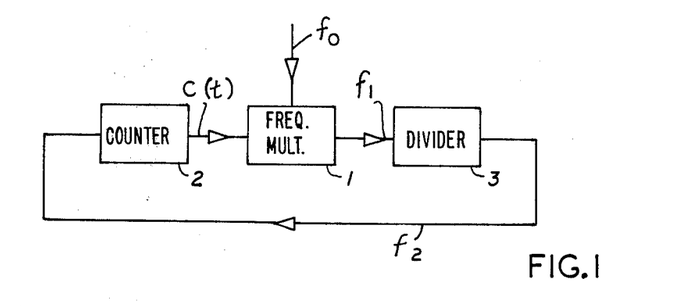
FIG. 1 is a generalized block diagram of the closed loop feedback digital system.

Referring to FIG. 1, a generalized block diagram of the closed loop feedback digital system is shown. One input of a frequency multiplier 1 is connected to the output of an up-down type counter 2, while a constant frequency input signal $f_0$ is fed into the other input of multiplier 1. The output signal $f_1$ of multiplier 1 is connected to the input of frequency divider 3. The output signal $f_2$, or first signal, of divider 3 is fed back into the count enable input of counter 2.

The output signal $f_1$ is, in the present invention, equal to the input signal $f_0$ multiplied by a first multiplication factor $c(t)/C_m$, where $c(t)$ is the number held in counter 2 at any time t and where $c_m$ is an integer constant determined by frequency multiplier 1. The frequency of signal $f_2$ is equal to the frequency of signal $f_1$ divided by an integer constant $d$, where $d$ is determined by the divider 3. Divider 3 is used to minimize the frequency error which may occur when $c(t)$ is changed by signal $f_2$. Each cycle of $f_2$ increments or decrements by one counter 2, depending upon its mode of operation, and so varies the frequency of signal $f_2$. Thus the general relationship between signals $f_0$ and $f_2$ is given by $f_2 = c(t)/dc_m$.

In order to produce a signal $f_2$ with an exponentially decreasing frequency, counter 2 is set in the count-down mode and $c(t)$ is set at an initial value $c_0$ which is less than $c_m$, which is necessary for the proper operation of the signal system. The initial value $c_0$ determines the initial frequency of signal $f_2$.

The number $c(t)$ is decremented by one for each cycle of signal $f_2$. It can be seen that the larger the number $c(t)$ is the higher the frequencies of signals $f_1$ and $f_2$ will be, and thus the faster counter 2 will be decremented, and the faster the frequency of signal $f_2$ will decrease. As $c(t)$ decreases, the frequency of signals $f_1$ and $f_2$ will also decrease, and the counter 2 will be decremented more slowly, which has the effect of decreasing the frequencies of signals $f_1$ and $f_2$ even more slowly than before. This feedback of signal $f_2$ to counter 2 causes the frequency of signal $f_2$ to decrease at a piecewise linear rate which is approximated by the decreasing exponential equation:

$$Q \doteq \text{frequency of signal } f_2 \doteq \frac{[(c_0 + \tfrac{1}{2})\exp(-at) - \tfrac{1}{2}]}{f_0/c_m}$$

where
$c_0$ = the initial value of $c(t)$
$f_0$ = frequency of signal $f_0$
$a = f_0/(c_m d)$ The length of time that the frequency of $f_2$ remains at a certain frequency before transition to a lower frequency is given approximately by the equation:

$$t_j \doteq (c_m d/f_0) \ln(1 + j'(c_0 + \tfrac{1}{2} - j))$$

where $t_j$ = the length of time interval $j$, $j = 1, \ldots c_m - 1$

Figure 3:
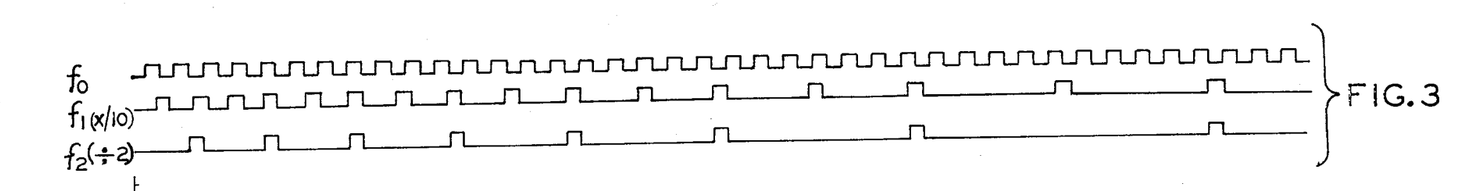
FIG. 3 is a graph showing signals produced by the closed loop feedback digital system.
Figure 4:
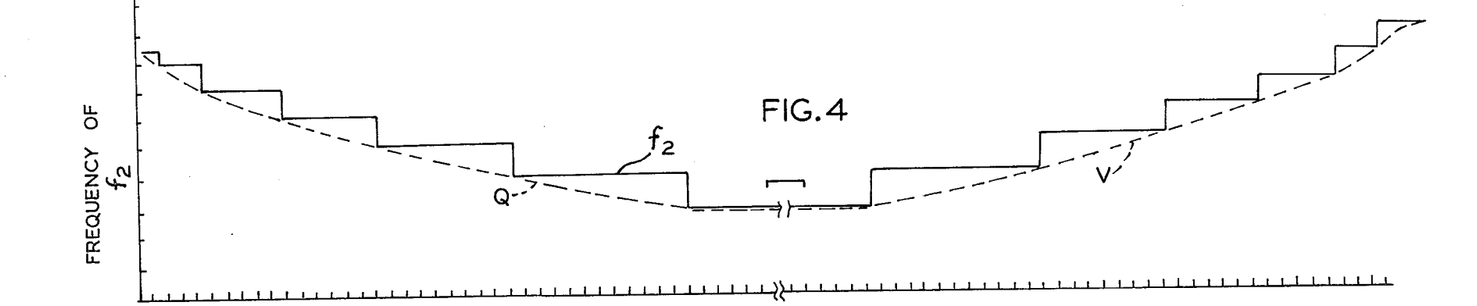
FIG. 4 is a graph showing the first signal compared with a smooth exponential-type curve.

FIG. 3 shows the relationship between signals $f_0$, $f_1$ and $f_2$, while FIG. 4 compares the piecewise linear rate of change of the frequency of signal $f_2$ with the decreasing exponential curve Q.

To produce a signal $f_2$ with an inverse exponentially increasing frequency, counter 2 is set in the count-up mode and $c(t)$ is initially set at an integer number $c_0$ greater than o and less than $c_m$. It is obvious that the circuit won't work if $c(t)$ is 0 (since then $f_2$ will always have zero frequency and since $c(t)$ cannot equal or exceed $c_m$, the frequency of signal $f_2$ can never equal or exceed the frequency of signal $f_0$. The operation of the system is exactly the same as when it is in the exponentially decreasing mode. Since $c_0$ is low relative to later values of $c(t)$, the rate of increase of the frequency of signals $f_1$ and $f_2$ is initially relatively low, but as counter 2 is incremented the frequency of signal $f_2$ begins to increase, which in turn increases the rate of incrementation of counter 2 which in turn increases more rapidly than before the frequency of signal $f_2$. This feedback causes the frequency of $f_2$ to increase in a piecewise linear fashion which is approximated by the increasing exponential equation:

$$V \doteq \text{frequency of signal } f_2 \doteq [(c_0 - \tfrac{1}{2})\exp(at) + \tfrac{1}{2}] f_0 / C_m$$

The relation among signals $f_0$, $f_1$ and $f_2$ when the system is in the exponentially increasing mode is shown in FIG. 3, while the relation between the piecewise linearly increasing frequency of $f_2$ and curve V is shown in FIG. 4.

Figure 2:
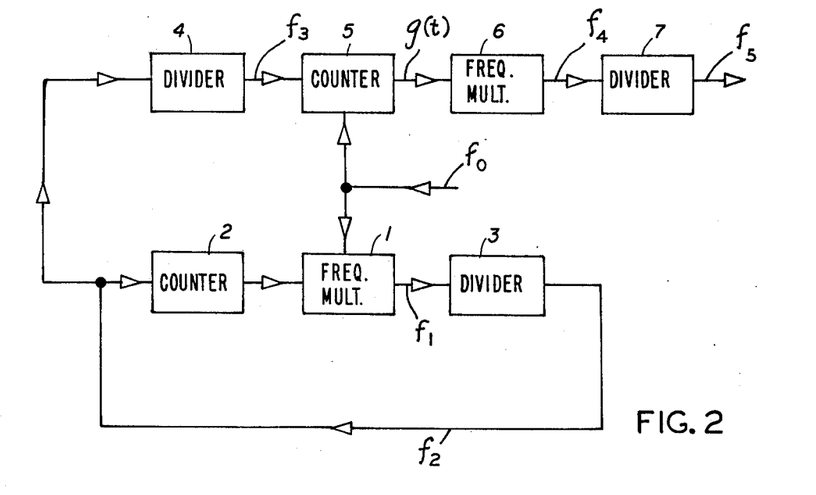
FIG. 2 is a generalized block diagram of the closed loop feedback digital system with the modification circuitry attached thereto.

It can be seen that the system generates a signal $f_2$ whose frequency varies in a generally exponential manner. Modification circuitry may be connected to the system to produce a signal from signal $f_0$ whose frequency approximates more closely an exponential curve than the frequency of signal $f_2$. A generalized block diagram of said closed loop feedback digital system with modification circuitry connected thereto is shown in FIG. 2. Signal $f_2$ is connected to the input of a frequency divider 4, the output of which is connected to the count enable input of a second up-down type counter 5. The output of counter 5 is connected to an input of a second frequency multiplier 6 while said signal $f_0$ is connected to another input of said multiplier 6. The output signal $f_4$ of multiplier 6 is connected to the input of a frequency divider 7.

The frequency of output signal $f_3$ of divider 4 is equal to the frequency of signal $f_2$ divided by an integer constant $b$. Each complete cycle of signal $f_3$ increments or decrements by one the number $g(t)$ held in counter 5, depending upon its mode of operation. The number $g(t)$ is transmitted to multiplier 6, which produces an output signal $f_4$, the frequency of which is equal to the frequency of $f_0$ multiplied by a second multiplication factor $g(t)/g_m$, where $g_m$ is an integer constant determined by the construction of multiplier 6 and is always greater than $g(t)$. Signal $f_4$ is transmitted to the input of divider 7 which produces an output signal $f_5$, the frequency of which is equal to the frequency of signal $f_4$ divided by an integer constant k determined by divider 7.

To exponentially increase the frequency of signal $f_5$, counter 2 is put into the count-down mode and counter 5 into the count-up mode. As described above, the frequency of signal $f_2$ will exponentially decrease, so that the frequency of signal $f_3$ will also exponentially decrease. Since signal $f_3$ increments counter 5, said counter 5 will be very rapidly incremented at the beginning, the rate of incrementation thereafter falling off in a generally exponential fashion until either $g(t)$ equals $g_m - 1$ or $c(t)$ equals 1. And, since the frequency of signal $f_4$ is directly proportional to the number $g(t)$, incrementation of $g(t)$ will cause the frequency of signal $f_4$ to increase in a piecewise linear manner which is approximated by the exponential equation:

$$Y = \text{frequency of signal } f_4 \doteq [g_0 + (d/b)(c_0 + \tfrac{1}{2})(1 - \exp(-at))](f_0'/g_m)$$

Figure 5:
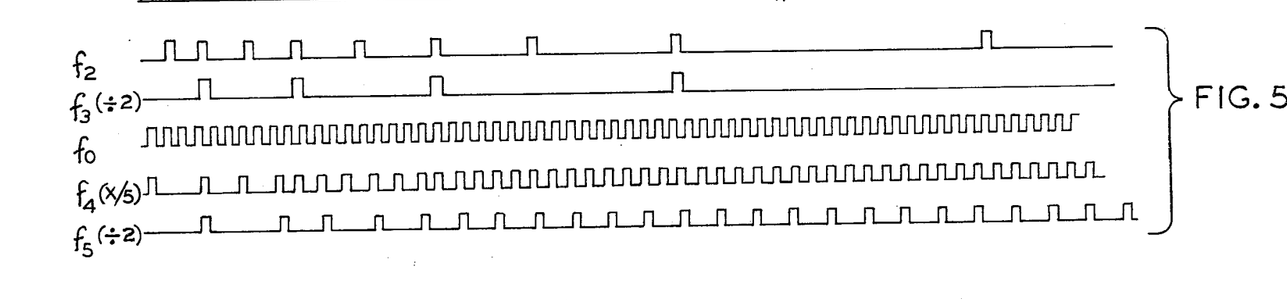
FIG. 5 is a graph showing signals produced by the combined closed loop feedback digital system and modification circuitry.
Figure 6:
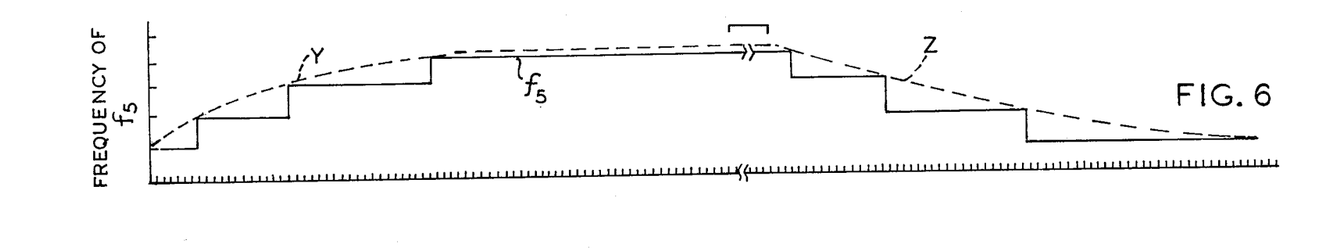
FIG. 6 is a graph showing the second signal compared with a smooth exponential-type curve.

The relationship among signals $f_0$, $f_2$, $f_3$, $f_4$ and $f_5$ is shown in FIG. 5, while the relationship between the frequency of signal $f_5$ and the increasing exponential curve Y is shown in FIG. 6.

To exponentially decrease the frequency of signal $f_5$, counter 2 is set in the count-up mode and counter 5 is set in the count-down mode. As shown in FIG. 4, the frequency of signal $f_2$ rises in an inverse exponential manner until either $g(t)$ equals 1 or $c(t)$ equals $c_m - 1$. Thus, counter 5 is decremented very slowly at first, and then increasingly rapidly as the frequency of signal $f_2$ increases more rapidly then before. The piecewise linear decrease in the frequency of signal $f_5$ is approximated by the equation:

$$Z = \text{frequency of signal } f_5 \doteq [g_0 + (d/b)(c_0 - \tfrac{1}{2})(\exp(at))](f_0'/g_m k)$$

The relationship among signals $f_0$, $f_2$, $f_3$, $f_4$ and $f_5$ where the frequency of $f_5$ is generally decreasing is shown in FIG. 5. The relationship between the frequency of signal $f_5$ and the decreasing exponential curve Z is shown in FIG. 6.

Figure 10:
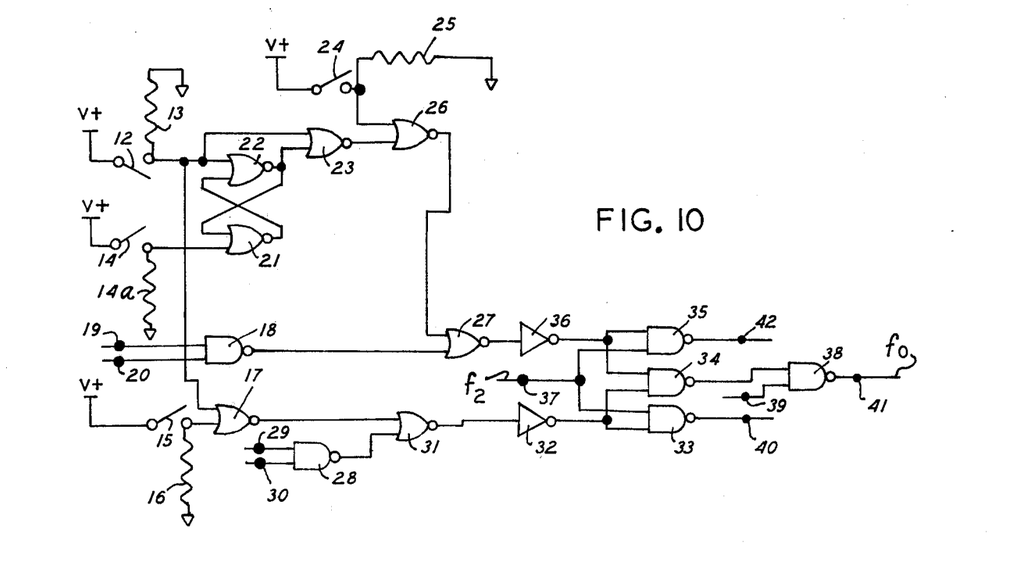
Figure 10A:
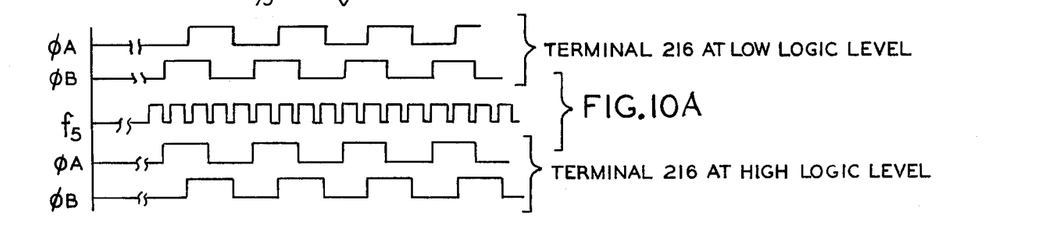
FIG. 10a is a schematic diagram of terminal 216 at both low and high logic levels.

Referring to FIG. 10, the fixed pole of switch 12 is connected to an input of NOR 22 and NOR 23 and to ground through resistor 13, while the movable contact of switch 12 is connected to a fixed positive voltage source. The other input of NOR 22 is connected to the output of NOR 21, while the output of NOR 22 is connected to an input of NOR 21 and to the other input of NOR 23. The other input of NOR 21 is connected to the fixed pole of switch 14 which is in turn connected to ground by resistor 14a. The movable contact of switch 14 is connected to a fixed positive voltage source. The output of NOR 23 is connected to an input of NOR 26 and the other input of NOR 26 is connected to the fixed pole of switch 24 to which is in turn connected to ground by resistor 25. The movable contact of switch 24 is connected to a fixed positive voltage supply. The inputs of NAND 18 are connected to terminals 19 and 20 respectively and the output of NAND 18 is connected to an input of NOR 27. The other input of NOR 27 is connected to the output of NOR 26, while the output of NOR 27 is connected to an input of NANDs 35 and 34 by an inverter 36.

An input of NOR 17 is connected to terminal 12 while the other input is connected to the fixed pole of switch 15 which is in turn connected to ground by resistor 16. The movable contact of switch 15 is connected to a fixed positive voltage source. The inputs of NAND 28 are connected to terminals 29 and 30 respectively, and the outputs of NAND 28 and NOR 17 are connected to the inputs of NOR 31 respectively. The output of NOR 31 is connected by an inverter 32 to an input of NAND 33 and to the other input of NAND 34. The other inputs of NANDs 33 and 35 are connected to terminal 37. The outputs of NANDs 33 and 35 are connected to terminal 37. The outputs of NANDs 33 and 35 are connected to terminals 40 and 42 respectively, while the output of NAND 34 is connected to an input of NAND 38. The other input and output of NAND 38 are connected to terminals 39 and 41 respectively.

Figure 7:
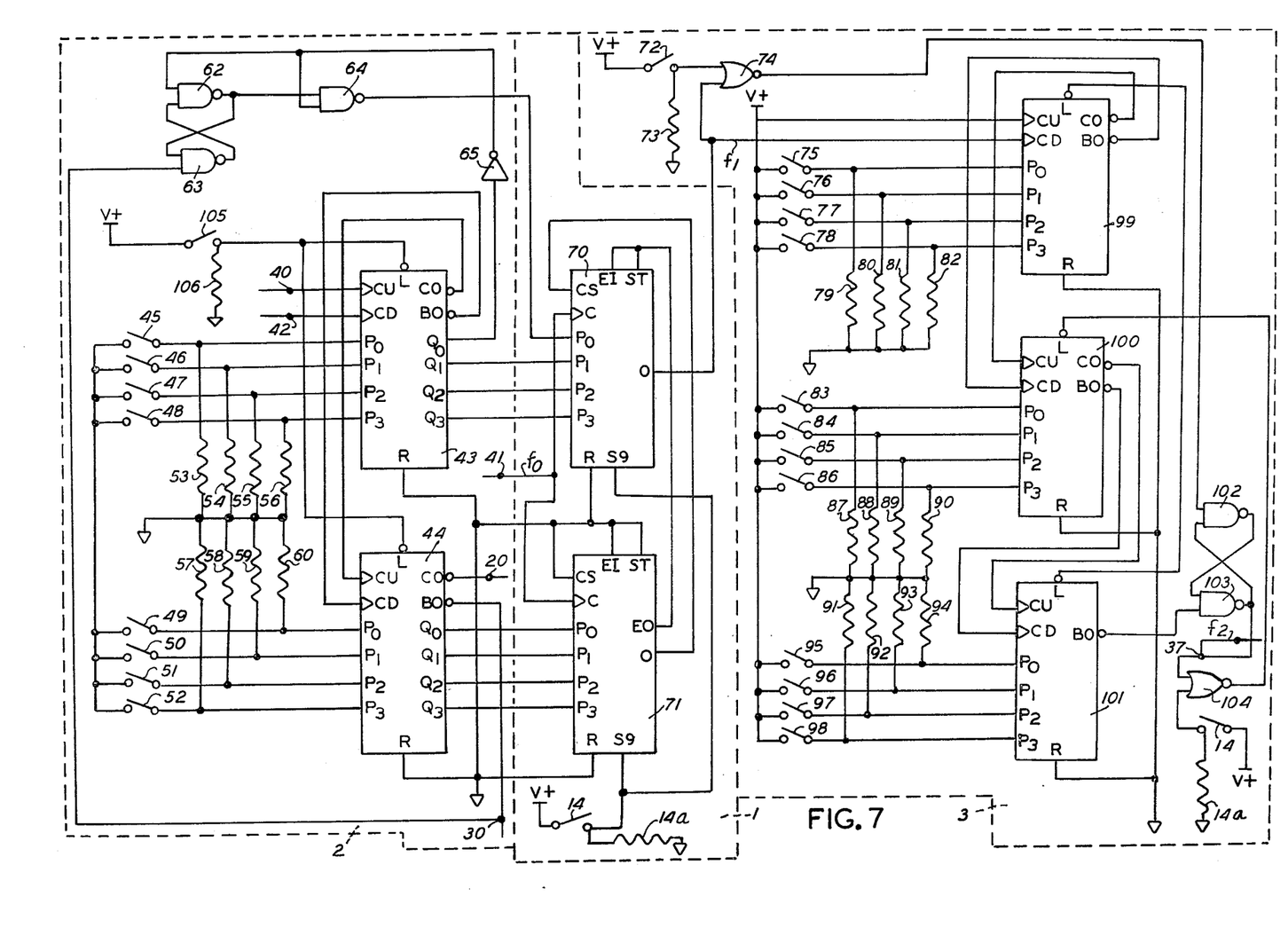
FIG. 7 is a schematic diagram of the circuitry of the closed loop feedback digital system.

Referring to FIG. 7, the fixed poles of switches 45, 46, 47, 48, 49, 50, 51 and 52 are connected to a positive fixed voltage source. The movable contacts of said switches 45, 46, 47, 48, 49, 50, 51 and 52 are connected to ground by resistors 53, 54, 55, 56, 57, 58, 59 and 60 respectively and also to terminals $P_0$, $P_1$, $P_2$ and $P_3$ of counter 43 and terminals $P_0$, $P_1$, $P_2$ and $P_3$ of counter 44, respectively. Terminals L, CU and CD of counter 43 are connected to the fixed pole of switch 105 and terminals 40 and 42 respectively. Terminals L, CU and CD of counter 44 are connected to the fixed pole of switch 105 and terminals CO and BO of counter 43 respectively. Terminals R of counters 43 and 44 are connected to ground. Terminal CO of counter 44 is connected to terminal 20, while terminal BO of counter 44 is connected to terminal 30 and to an input of NAND 63. The other input of NAND 63 is connected to the output of NAND 62, while the output of NAND 63 is connected to an input of said NAND 62. The other input of NAND 62 is connected to an input of NAND 64 and to the output of inverter 65, the input of inverter 65 being connected to terminal $Q_0$ of counter 43. The output of NAND 62 is connected to the other input of NAND 64, while the output of NAND 64 is connected to terminal $P_0$ of frequency multiplier 70. Terminal $Q_1$, $Q_2$ and $Q_3$ of counter 43 are connected to terminals $P_1$, $P_2$ and $P_3$ of multiplier 70, while terminals $Q_0$, $Q_1$, $Q_2$ and $Q_3$ of counter 44 are connected to terminals $P_0$, $P_1$, $P_2$ and $P_3$ of frequency multiplier 71. Terminals EI, ST, CS and R of multiplier 71 and terminal R of multiplier 70 are connected to ground. Terminals C of multipliers 70 and 71 are connected to terminal 41, while terminals S9 of multipliers 70 and 71 are connected to terminal 14. Terminal 0 of multiplier 71 is connected to terminal CS of multiplier 70, while terminals EI and ST of multiplier 70 are connected to terminal EO of multiplier 71. Terminal 0 of multiplier 70 is connected to terminal CD of counter 99 and to an input of NOR 74. The other input of NOR 74 is connected to the fixed pole of switch 72 which is in turn connected to ground by resistor 73. The output of NOR 74 is connected to an input of NAND 102.

Switches 75, 76, 77, 78, 83, 84, 85 and 86 each have a fixed pole connected to a positive fixed voltage source and have the movable contact connected to ground through resistors 79, 80, 81, 82, 87, 88, 89 and 90, respectively. The movable contacts of switches 75, 76, 77, 78, 83, 84, 85 and 86 are also connected to terminals $P_0$, $P_1$, $P_2$ and $P_3$ of counter 99 and terminals $P_0$, $P_1$, $P_2$ and $P_3$ of counter 100, respectively. Switches 95, 96, 97 and 98 each have a fixed pole connected to a positive fixed voltage source and have the movable contact connected to ground by resistors 91, 92, 93 and 94 respectively. Said movable contacts of switches 95, 96, 97 and 98 are also connected to terminals $P_0$, $P_1$, $P_2$ and $P_3$ of counter 101 respectively. Terminals L of counters 99, 100 and 101 are connected to the output of NOR 104. Terminals CO and BO of counter 99 are connected respectively to terminals CU and CD of counter 100, while terminal CU of counter 99 is connected to a positive fixed voltage supply. Terminals CO and BO of counter 100 are respectively connected to terminals CU and CD of counter 101. Terminals R of counters 99, 100, and 101 are connected to ground. Terminal BO of counter 101 is connected to one input of NAND 103, while the other input of NAND 103 is connected to the output of NAND 102. The output of NAND 103 is connected both to the other input of NAND 102, terminal 37 and to an input of NOR 104. The other input of NOR 104 is connected to the fixed pole of said switch 14.

Figure 8:
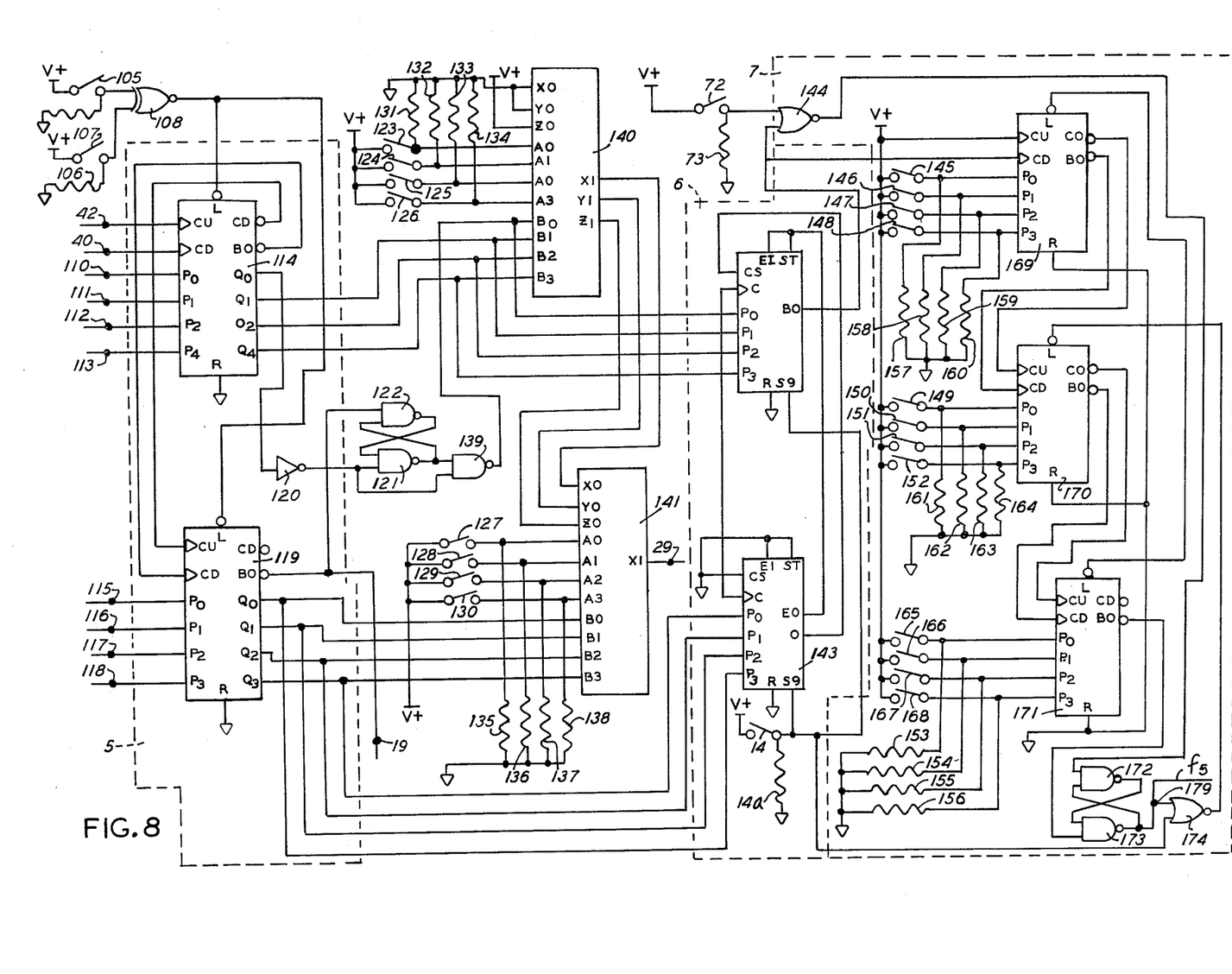
FIG. 8 is a schematic diagram of the modification circuitry.

Referring to FIG. 8, one terminal of exclusive OR 108 is connected to the fixed pole of switch 105 which is in turn connected to ground by resistor 106. The movable contact of switch 105 is connected to a fixed positive voltage source. The other terminal of exclusive OR 108 is connected to the fixed pole of switch 107. The output of exclusive OR 108 is connected to terminals L of counters 114 and 119. Terminals CO and BO of counter 114 are connected respectively to terminals CU and BU of counter 119, while terminals R of said counter 114 and 119 are tied to ground. Terminals $P_0$, $P_1$, $P_2$ and $P_3$ of counter 114 are respectively connected to terminals 110, 111, 112 and 113, while terminals $P_0$, $P_1$, $P_2$ and $P_3$ of counter 119 are respectively connected to terminals 115, 116, 117 and 118. Terminal $Q_0$ of counter 114 is connected to the input of inverter 120, the output of which is connected to one input of each of NANDs 121 and 139. The other input of NAND 121 is connected to the output of NAND 122, while the output of NAND 121 is connected to an input of NAND 122 and the other input of NAND 139. The other input of NAND 122 is connected to both terminal 19 and to terminal BO of counter 119. The output of NAND 139 is connected to terminal $B_0$ of comparator 140 and to terminal $P_0$ of frequency multiplier 142. Outputs $Q_1$, $Q_2$ and $Q_3$ of counter 114 are connected to inputs $B_1$, $B_2$ and $B_3$ of comparator 140 respectively, and also to inputs $P_1$, $P_2$ and $P_3$ of multiplier 142 respectively. Switches 123, 124, 125 and 126 each have a fixed pole connected to a positive fixed voltage source and have their movable contacts connected to ground through resistors 131, 132, 133 and 134 respectively, last said movable contacts being also connected to inputs $A_0$, $A_1$, $A_2$ and $A_3$ of comparator 140. Inputs $X_0$ and $Y_0$ of comparator 140 are connected to ground while input $Z_0$ of comparator 140 is connected to a positive fixed voltage supply. Outputs $X_1$, $Y_1$ and $Z_1$ of comparator 140 are respectively connected to inputs $X_0$, $Y_0$ and $Z_0$ of comparator 141. Outputs $Q_0$, $Q_1$, $Q_2$ and $Q_3$ of counter 119 are connected to inputs $B_0$, $B_1$, $B_2$ and $B_3$ of comparator 141 respectively and are also connected to inputs $P_0$, $P_1$, $P_2$ and $P_3$ of counter 143 respectively. Switches 127, 128, 129 and 130 each have their fixed pole connected to a positive fixed voltage source, and have their movable contacts connected to ground through resistors 135, 136, 137 and 138 respectively, the last said movable contacts being also connected to inputs $A_0$, $A_1$, $A_2$ and $A_3$ respectively of comparator 141. Output $X_1$ of comparator 141 is connected to terminal 29.

Inputs C of rate multipliers 142 and 143 are connected to terminal 39, while inputs EI, R and ST of multiplier 143 and terminal R of multiplier 142 are connected to ground. Inputs EI and ST of multiplier 142 are connected to output EO of multiplier 143, and input CS of multiplier 142 is connected to output O of multiplier 143. Inputs S9 of multiplier 142 and 143 are connected to the fixed pole of switch 14. Output 0 of multiplier 142 is connected to an input of NOR 144 and to input CD of counter 169. The other input of NOR 144 is connected to the fixed pole of switch 72, while the output of NOR 144 is connected to the input of NAND 172.

Switches 145, 146, 147 and 148 each have one pole connected to a positive fixed voltage source, and have their movable contacts connected both to ground through resistors 157, 158, 159 and 160 respectively to inputs $P_0$, $P_1$, $P_2$ and $P_3$ of counter 169 respectively.

Input CU of counter 169 is connected to a positive fixed voltage supply, while outputs CO and BO of counter 169 are connected to inputs CU and CD of counter 170. Switches 149, 150, 151 and 152 each have one fixed pole connected to a positive fixed voltage source and have their movable contacts connected both to ground by resistors 161, 162, 163 and 164 respectively, and to inputs $P_0$, $P_1$, $P_2$ and $P_3$ of counter 170 respectively. Outputs CO and BO of counter 170 are respectively connected to inputs CU and CD of counter 171.

Switches 153, 154, 155 and 156 each have one fixed pole connected to a positive fixed voltage source, and have their movable contacts connected both to ground by resistors 165, 166, 167 and 168 respectively and to inputs $P_0$, $P_1$, $P_2$ and $P_3$ of counter 171 respectively. Inputs R of counters 169, 170 and 171 are connected to ground while terminals L of counters 169, 170 and 171 are connected to the output of NAND 174. Output BO of counter 171 is connected to an input of NAND 173, the other input of NAND 173 being connected to the output of NAND 172. The other input of NAND 172 is connected to the output of NAND 173, which is in turn connected to an input of NOR 174 and terminal 179. The other input of NOR 174 is connected to the fixed pole of switch 14.

Figure 11:
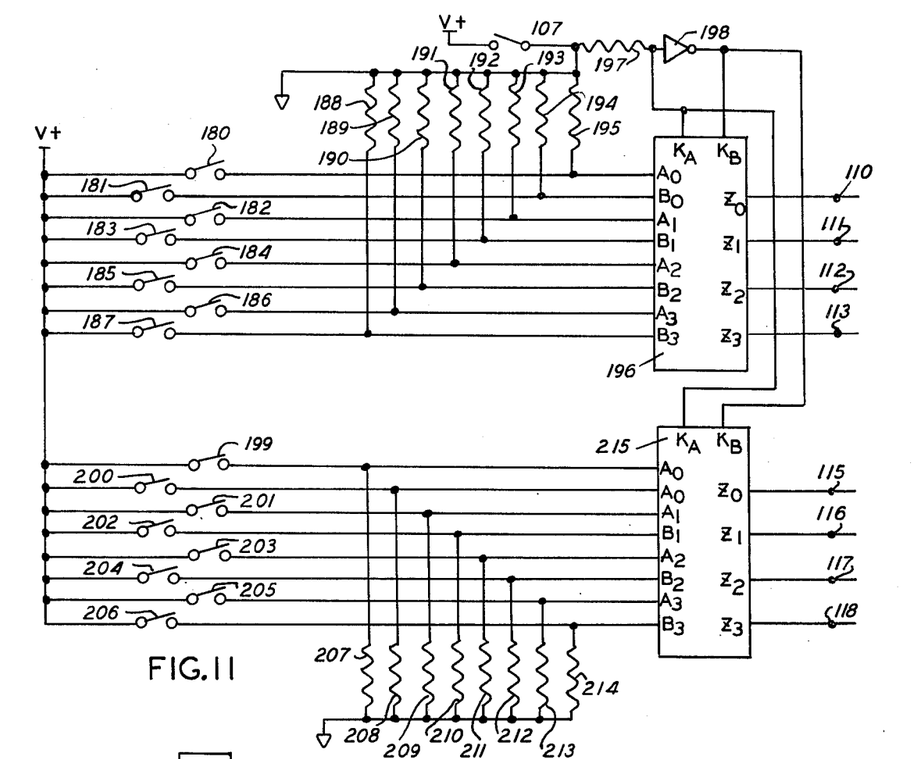

Referring to FIG. 11, switches 180, 181, 182, 183, 184, 185, 186 and 187 each have one pole connected to a positive fixed voltage source, and have their movable contacts connected both to ground by resistors 195, 194, 193, 192, 191, 190, 189 and 188 respectively and to inputs $A_0$, $B_0$, $A_1$, $B_1$, $A_2$, $B_2$, $A_3$ and $B_3$ respectively of multiplexer 196. The fixed pole of switch 107 is connected both to ground by resistor 197 and to the input of inverter 198. Said input of inverter 198 is connected to inputs $K_A$ of multiplexers 196 and 215, while the output of inverter 198 is connected to inputs $K_B$ of multiplexers 196 and 215. Outputs $Z_0$, $Z_1$, $Z_2$ and $Z_3$ of multiplexer 196 are connected respectively to terminals 110, 111, 112 and 113.

Switches 199, 200, 201, 202, 203, 204, 205 and 206 each have one pole connected to a positive fixed voltage source and have their movable contacts connected both to ground by resistors 207, 208, 209, 210, 211, 212, 213 and 214 respectively and to inputs $A_0$, $B_0$, $A_1$, $B_1$, $A_2$, $B_2$, $A_3$ and $B_3$ respectively of multiplexer 215. Outputs $Z_0$, $Z_1$, $Z_2$ and $Z_3$ of multiplexer 215 are respectively connected to terminals 115, 116, 117 and 118.

Figure 9:
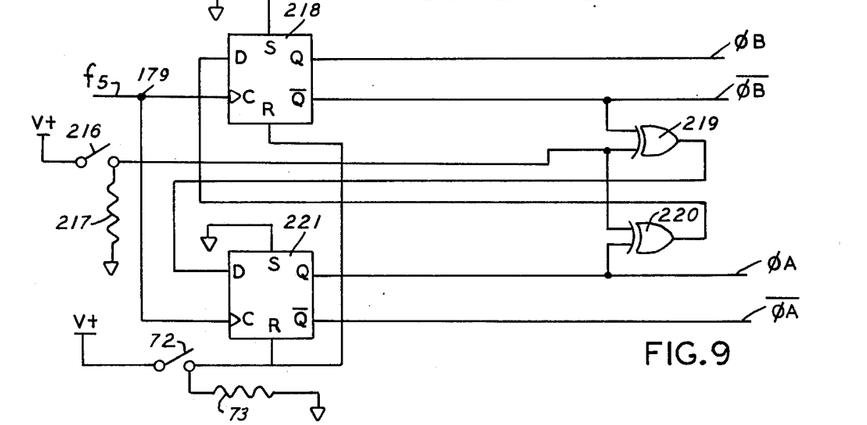
FIGS. 9, 10 and 11 are schematic diagrams of interface and enabling circuitry.

Referring to FIG. 9, inputs C of D-type flip flops 218 and 221 are connected to terminal 179. The fixed pole of switch 216 is connected to ground by resistor 217 and to an input each of exclusive ORs 219 and 220, while the movable contact of switch 216 is connected to a fixed positive voltage source. Inputs S of flip flops 218 and 221 are connected to ground while inputs R of flip flops 218 and 221 are connected to the fixed pole of switch 72. Input D of flip flop 218 is connected to the output of exclusive OR 220, while input D of flip flop 221 is connected to the output of exclusive OR 219. The other input of exclusive OR 219 is connected to the Q output of flip flop 218, while the other input of exclusive OR 220 is connected to the Q output of flip flop 221.

Before the digital system circuitry is energized, the value of $c_0$ and $d$ are set. The value of $c_0$ is the initial value of counter 2, counter 2 being comprised in decade counters 43 and 44 connected in cascade, and is set by the position of switches 45 through 52, inclusive, in a manner well known in the art. The value of $c_0$ thus can be set at any number between 0 and 99. The value of $c_n$ is 100 in this embodiment. The value of $d$ determines the dividing factor of divider 3, which comprises counters 99, 100 and 101 connected in cascade. Said value of $d$ is set by the position of switches 75 through 78, 83 through 86 and 95 through 98, inclusive, in a manner well known in the art.

The value of $d$ is loaded into counters 99, 100 and 101 by closing switch 14 which sets the output of NOR 104 and thus the inputs L of counters 99, 100 and 101 to a low logic level which enables the loading of the value $d$ into said counters 99, 100 and 101.

To initiate the operation of the control system in the decreasing exponential frequency mode, switches 14, 15 and 24 are opened and switches 12 and 105 are closed. A 2 MHz square wave type signal is applied to terminal 39 which results in a 2 MHz signal $f_0$ being present at terminal 41. Since the modification circuitry (shown in FIG. 8) is not connected to the control circuitry, a high logic level signal is applied to terminals 19 and 29. Except under conditions set forth below, the outputs of inverters 32 and 36 are at a high logic level.

As shown in FIG. 7, signal $f_0$ is introduced into rate multipliers 70 and 71 and produces a square wave type signal $f_1$ with a frequency equal to the frequency of signal $f_0$ multiplied by the factor $c_0/c_m$, where $c_m$ is a constant determined by the internal construction of multipliers 70 and 71. In this embodiment, $c_m$ is equal to 100.

Since in this embodiment counters 99, 100 and 101 are responsive to input signal transitions from a low to a high logic level, every time signal $f_1$ goes to a high logic level, the cascaded counter arrangement of counters 99, 100, 101 is decremented by one. When all three counters 99, 100 and 101 reach zero, the next time signal $f_1$ goes to a low logic level, output BO of counter 101 goes to a low logic level which causes the outputs of NANDs 102 and 103 to change state. Therefore, the level of signal $f_2$ goes from a low to a high logic level, and further the value of $d$ is reloaded into counters 99, 100 and 101. Since the counters 99, 100 and 101 will then contain a number greater than zero, output BO of counter 101 goes again to a high logic level.

The next time signal $f_1$ goes to a high logic level, the output of NOR 74 will be at a high logic level which will change the states of NANDs 102 and 103 to a high and low logic level, respectively. The signal $f_2$ at terminal 37 will thus go back to a low logic level, which in turn forces terminal 42 to go to a high logic level, which decrements the cascaded counter arrangement of counters 43 and 44 by one.

The above described cycle will continue with the cascaded counter arrangement of counters 43 and 44 being decremented by one for each time counters 99, 100 and 101 contain zero. This, of course, decreases the frequency of signal $f_1$ as shown in FIGS. 3 and 4. This cycle will continue until counters 43 and 44 contain zero. To prevent multipliers 70 and 71 from multiplying the frequency of signal $f_0$ by zero, the logic level of output 80 of counter 44 (the borrow output) goes from high to low and triggers the flip flop arrangement of NANDs 62 and 63, which impresses a high logic level signal on input $P_0$ of multiplier 70. The logic level change of output BO of counter 44 also causes the output of NAND 34 to maintain a low logic level, which in turn maintains a constant high logic level at terminal 41, regardless of the state of the 2 MHz signal applied at terminal 39. As a result, signal $f_1$ will have zero frequency, as will signal $f_2$ until the system is reset.

To set the control system in the increasing exponential frequency mode, assuming that the values of $c_0$ and $d$ have been loaded and that NANDs 102 and 103 have been set as described above, switches 12, 14 and 15 are opened and switches 24 and 105 are closed. The only change this makes in the operation of the circuitry is that when terminal 37 goes to a high logic level, terminal 40 will go to a low logic and thereby increment counter 43 by one and increase the frequency of signal $f_2$ at terminal 37 as opposed to decrementing counter 43 by one to decrease the frequency of signal $f_0$. FIG. 6 illustrates how the frequency of signal $f_2$ increases over time.

When the cascaded arrangement of counters 43 and 44 is incremented to 99, the next time terminal 40 goes low, output CO of counter 44 goes to a low logic level. This causes the output of NANDs 35 and 38 to assume a constant high logic level forcing the frequency of both signals $f_1$ and $f_2$ to be zero and thereby shutting down the system.

With the modification circuitry of FIG. 8 connected to the control system circuitry of FIG. 7 at their common terminals, the digital system circuitry of FIG. 7 at their common terminals, the digital system circuitry operates in the same manner as described above.

The value of $g_0$, the initial value contained in counter 5, is set by the position of switches 181, 183, 185, 187, 200, 202, 204 and 206. Since counter 5 comprises a pair of decade counters 114 and 119 connected in cascade arrangement, $g_0$ may be set from 0 to 99. The maximum frequency that $f_5$ may attain is set by the position of switches 123 to 130 inclusive. The value of the constant k of divider 7, which comprises decade counters 169, 170 and 171 connected in cascade arrangement is set by the position of switches 145 to 156 inclusive, and may be varied between 1 and 999. The number $g_n$ is set at 100 in this embodiment by the internal construction of multipliers 142 and 143.

Before the operation of the digital system and modification circuitry is initiated, switches 105 and 107 are opened and switches 14 and 72 are closed momentarily. This loads the value of $c_0$, $g_0$, $d$ and $k$ into counter 2, counter 5, divider 3 and divider 7, respectively. Divider 4, in this embodiment, divides the frequency of signal $f_2$ by 1, and thus is merely a conductor between NANDs 33 and 35 and counters 114 and 119. (NANDs 33 and 35 invert signal $f_2$ and gate it to one of the inputs of counter 43, depending upon the mode of operation.)

To now produce a signal $f_5$ at terminal 179 with an exponentially increasing frequency, switches 12 and 105 are closed and switches 14, 15, 24, 72 and 107 are opened. Each time terminal 42 goes to a high logic level, the cascaded counter arrangement of counters 114 and 119 will be incremented by one, which in turn increases the frequency of signals $f_4$ and $f_5$. The frequency of said signal $f_4$ is divided by counters 169, 170 and 171 to produce signal $f_5$ in the same manner that counters 99, 100, and 101 divide the frequency of signal $f_1$ to produce signal $f_2$. Since $g(t)$ is increasing, the frequency of signal $f_5$ is also increasing at an exponential rate. When the number $g(t)$ contained in counters 114 and 119 exceeds the number corresponding to the predetermined final frequency of signal $f_5$ as preset by switches 123 to 130 inclusive connected to comparators 140 and 141 as shown in FIG. 8, output $X_1$ of comparator 141 goes to a low logic level. This causes terminal 40 to go to a low logic level. The next time signal $f_2$ goes to a low logic level, terminal 40 goes to a high logic level and decrements the cascaded arrangement of counters 114 and 119 by one. This sequence will be repeated every time counter 114 is thereafter incremented until the circuitry is deactivated or put into the decreasing frequency mode, thus maintaining the frequency of signal $f_5$ at the predetermined level.

To produce an exponentially decreasing frequency signal $f_5$ at terminal 179, assuming that all steps to load the several counters have been taken as described above, switches 24 and 105 are closed and switches 12, 14, 15, 72 and 107 are opened. Thus every time signal $f_2$ at terminal 37 goes to a low logic level, i.e., for each cycle of signal $f_2$ the value $g(t)$ of the cascaded counter arrangement of counters 114 and 119 is decremented by one, which causes the frequencies of signals $f_4$ and $f_5$ to decrease.

The frequency of $f_5$ will continue to inverse exponentially decrease until either counters 43 and 44 are incremented to 99 or counters 114 and 119 are decremented to zero. When counters 43 and 44 are incremented to 99, as described above terminal 40 remains at a low logic level preventing any change in $c(t)$ or $g(t)$ and thereby cause the frequency of signal $f_5$ to be zero. When counters 114 and 119 are attempted to be decremented below zero (before counters 43 and 44 are incremented to 99), output BO of counter 119 goes to a low logic level and, by means of NANDs 121, 122 and 139 and inverter 120, ensures that multipliers 142 and 143 will always multiply the frequency of signal $f_0$ by 0.01 (1/100). The frequency of signal $f_4$ will be maintained at 1/100 the frequency of signal $f_0$ (and the frequency of signal $f_5$ will be equal to the frequency of signal $f_4$ divided by $K$) until the frequency mode is changed or the circuitry denergized.

It is well known in the art how to provide counting means which will initiate the control system and modification circuitry and allow it to operate either in the increasing frequency mode for a certain preset number of cycles of signal $f_5$ and then to reverse the frequency mode of operation to the decreasing frequency mode and to operate the circuitry for a second preset number of cycles. This allows stepping motors to be accelerated exponentially to a desired velocity, for a preset number of steps, and to be decelerated inverse exponentially to achieve a final precalculated rotor position. FIG. 11 shows circuitry for maintaining a constant frequency signal $f_5$. Switch 107 is closed, thereby connecting the fixed poles of switches 180, 182, 184, 186, 199, 201, 203 and 205 to terminals 110, 111, 112, 113, 115, 116, 117 and 118 respectively, and thus to the inputs of counters 114 and 119. The number determined by the last said switches will be continuously maintained in counters 114 and 119 thus keeping the frequency of signals $f_4$ and $f_5$ constant.

A circuit is shown in FIG. 9 to energize a four phase stepping motor by signal $f_5$. The logic state of terminal 216 determines the sequence of winding energization, said sequences being shown on the graph in FIG. 9.

It can be seen that we have provided a completely digital closed loop feedback system for producing generally exponentially increasing and inverse exponentially decreasing frequency square wave signals, and have provided modification circuitry to adapt said control system for use with stepping motors.

It will, of course, be understood that various changes may be made in the form, details, arrangement and proportion of the parts without departing from the scope of the invention, which generally stated, consists in the matter set forth in the accompanying claims.

What is claimed is:

1. An electronic closed loop digital feedback system for producing square wave type output signal of essentially exponentially varying frequency from a constant frequency square wave type input signal, the system comprising:

first frequency multiplier means for generating a first signal, the frequency of which is equal to the frequency of the input signal multiplied by a first multiplication factor, first frequency divider means for receiving the first signal and producing a second signal with a frequency directly proportional to the frequency of said first signal, first counter means connected to the first frequency multiplier means for determining the first multiplication factor thereof, the first counter means being responsive to the cycles of the second signal, the frequency of the second signal increasing when the first counter means is being incremented and decreasing when the first counter means is being decremented, second frequency divider means for receiving the second signal and producing a third signal of a frequency directly proportional to the frequency of the second signal, second frequency multiplier means for receiving the input signal and generating an output signal of a frequency equal to the frequency of the input signal multiplied by a second multiplication factor, and second counter means connected to the second frequency multiplier means for determining the second multiplication factor, the second counter means being responsive to the cycles of the third signal, the frequency of the output signal increasiing when the second counter means is being incremented and the first counter means is being decremented and decreasing when the second counter means is being decremented and the first counter means is being incremented.

2. The apparatus of claim 1 and further comprising means to set an upper and lower limit on the frequency of the output signal.

3. The apparatus of claim 1 and further comprising means to preset the first and second counter means to determine the initial frequency of the second signal and the output signal.

* * * * *